United States Patent [19]

Wylie

[11] 4,286,813

[45] Sep. 1, 1981

[54] SECURITY LOCKING ASSEMBLY

[75] Inventor: William H. Wylie, Oklahoma City, Okla.

[73] Assignee: Metalfab Industries, Inc., Oklahoma City, Okla.

[21] Appl. No.: 65,929

[22] Filed: Aug. 13, 1979

[51] Int. Cl.³ .............................................. E05C 13/02
[52] U.S. Cl. ................................. 292/251; 292/315
[58] Field of Search ............................. 292/251, 315; 70/229–232; 174/37; 151/69

[56] References Cited

U.S. PATENT DOCUMENTS

| | | | |
|---|---|---|---|
| 2,033,371 | 3/1936 | Benoggio | 292/327 X |
| 2,405,251 | 8/1946 | Glaye | 292/251 X |
| 3,330,586 | 7/1967 | Becker | 292/315 |
| 3,496,742 | 2/1970 | Rothweiler et al. | 70/232 |
| 3,572,795 | 3/1971 | Howard | 292/251 |
| 3,782,146 | 1/1974 | Franke | 292/251 X |
| 4,094,173 | 6/1978 | Brown | 70/232 X |

Primary Examiner—Richard E. Moore
Attorney, Agent, or Firm—Dunlap, Codding & McCarthy

[57] ABSTRACT

A security locking assembly for substantially preventing unauthorized removal of the bolt securing two members together, the security locking assembly comprising a locking assembly housing secured to the two members by the bolt; a pin, having a first end portion and a second end portion, extendable through a portion of the locking assembly housing; a locking device engaging the first and second end portions of the pin to prevent unauthorized removal of the pin from the locking assembly housing without destruction of a portion of the pin and/or the locking assembly housing; and a cover assembly cooperating with the locking assembly housing and the pin to prevent access to the bolt securing the two members together.

13 Claims, 6 Drawing Figures

SECURITY LOCKING ASSEMBLY

CROSS-REFERENCE TO RELATED APPLICATIONS

This application is related to an application entitled Security Locking Assembly, U.S. Ser. No. 066,079, filed simultaneously with this application, both applications being assigned to the assignee of the present invention.

BACKGROUND OF THE INVENTION

1. Field of the Invention

This invention relates to a security locking assembly and, more particularly, but not by way of limitation, to a security locking assembly for retarding unauthorized entry into enclosures, such as a housing utilized in an electrical distribution systems wherein the housing is suitable for installation and use at ground level. In one aspect, the invention relates to a security locking assembly for substantially preventing unauthorized removal of a bolt from a multi-section housing assembly, such as a power distribution housing assembly, in which an upper section is secured to a lower section.

2. Brief Description of the Prior Art

In recent years, utilities have more and more been attracted to the use of underground cables and conduits in distribution systems, in preference to the older system of overhead lines supported by poles. However, in the use of underground cables and conduits in such distribution systems, transformers, switching and fusing gear, and the like, must be readily accessible for maintenance, repair, replacement and servicing. Accordingly, surface-mounted stations, which utilize a pedestal housing assembly, have been employed as a covering and enclosure for transformers, switching and fusing gear, and the like.

Problems have, nevertheless, been encountered in the use of the pedestal housing assembly for surface or grade level installations in that unauthorized tampering and entry into the equipment often occurs. In an effort to prevent unauthorized entry and tampering of the equipment, numerous types of security locking assemblies have heretofore been proposed. Certain of the locking assemblies have included the use of specially designed bolts which require a special tool for removal, the use of cup-shaped members to surround the head of the bolt which require modification of the housing for receiving a plurality of prongs extending from the cup member, and the like.

Numerous other security locking systems, much more sophisticated and complicated than those set forth above, have also been proposed in the prior art. These more sophisticated and complicated locking systems generally require substantial modification or complete redesign of the housing assembly. Typical of these prior art security locking systems are the systems disclosed in U.S. Pat. Nos. 4,113,297 and 4,005,253.

Even in view of the numerous systems heretofore suggested for preventing unauthorized entry into a housing containing electrical apparatus, such as transformers, and their related fusing and switch gear, new and improved security locking systems are being sought which do not require substantial modification of the housing, and which, at the same time, do not require the repairmen desiring entry into the housing to have an unusually large assortment of specialized tools and equipment.

Therefore, an object of the present invention is to provide an improved security locking assembly for retarding unauthorized access to a housing assembly for electrical apparatus wherein the housing assembly is suitable for installation and use at ground level.

Another object of the present invention is to provide an improved security locking system which, while retarding unauthorized entry to a housing assembly for electrical apparatus, can readily be disengaged by a repairman without the use of a substantial number of specialized tools.

Another object of the present invention is to provide an improved security locking assembly for substantially preventing unauthorized entry into a housing assembly for an electrical apparatus which does not require substantial modification of the housing assembly.

Another object of the invention is to provide an improved security locking assembly which is durable in construction, economical to manufacture, and which does not suffer from the disadvantages of the prior art devices.

Other objects, advantages and features of the present invention will become apparent to those skilled in the art from the following detailed description when read in conjunction with the accompanying drawings which illustrate the invention, and the appended claims.

DETAILED DESCRIPTION OF THE INVENTION

Figure 1:
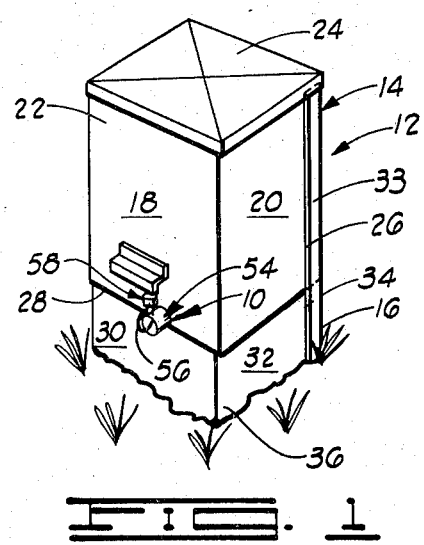
FIG. 1 is a perspective view of a housing assembly for an electrical apparatus suitable for installation and use at ground level having the improved security locking assembly of the present invention secured thereto.

Referring now to the drawings, in which like numerals are employed to designate like parts throughout same, and particularly to FIGS. 1-4, the security locking assembly 10 is mounted to a housing assembly 12 for retarding unauthorized access to electrical apparatus (not shown) contained within the housing assembly 12.

The housing assembly 12, depicted as a pedestal-type housing assembly, is formed of at least two members, such as a upper housing 14 and a lower housing 16. The upper housing 14, a hollow member, is formed of a multi-plate construction and is provided with three side walls, only side walls 18 and 20 being illustrated. The upper housing 14 has an upper end portion 22 having a cap member 24 secured thereto, a lower end portion 26, and a lower end 28.

The lower housing 16, a hollow member, is formed of a multi-plate construction and has four side walls, only side walls 30 and 32 being depicted. The back side wall (not shown) of the lower housing 16 extends upwardly from the other three side walls of the lower housing 16 and serves as the back side wall for both the upper housing 14 and the lower housing 16 when the upper and lower housings 14, 16 are in the assembled position. Further, the back side wall of the lower housing 16 has a U-shaped configuration in the portion serving as the back side wall of the upper housing 14, the leg portions, such as leg portion 33 of the U-shaped back side wall adapted to receive the side walls 20, and the opposed side wall (not shown) of the upper housing 14. The construction of such a pedestal-type housing assembly is well known in the art.

Further, the lower housing 16 has an upper end portion 34 and a lower end portion 36. The lower end portion 36 of the lower housing 16 is operably positioned upon and connected to a foundation, such as a cement pad (not shown), in accordance with procedures which are well known in the art. The lower housing 16 is constructed such that the upper end portion 34 of the lower housing 16 is telescopically received by the lower end portion 26 of the upper housing 14 so that a ridge 38, shown in FIGS. 2 and 3, is formed between the lower end 28 of the upper housing 14 and the side walls, such as side wall 30 of the upper end portion 34 of the lower housing 16.

Figure 2:
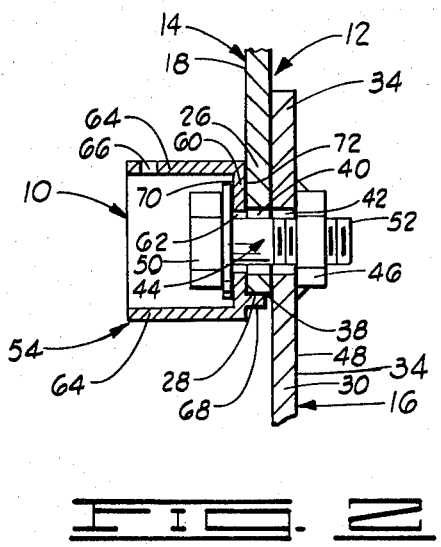
FIG. 2 is a sectional view of one embodiment of the security locking assembly of the present invention operably positioned on a housing assembly having an upper section and a lower section, as depicted in FIG. 1, without the pin or cover assembly positioned within the locking assembly housing.
Figure 3:
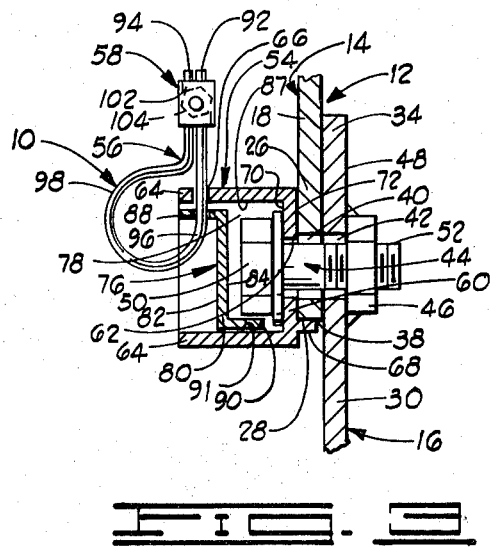
FIG. 3 is a sectional view of the security locking assembly of FIG. 2, having the pin and cover assembly positioned within the locking assembly housing of the security locking assembly.

With reference to FIG. 2, an aperture 40 is positioned within one of the side walls, such as side wall 18, of the upper housing 14 in the lower end portion 26 thereof; and an aperture 42 is positioned within an adjacent side wall, such as side wall 30, of the lower housing 16 in the upper end portion 34 thereof, the apertures 40 and 42 of the upper and lower housings 14 and 16, respectively, being alignable one with another for receiving a bolt 44 when the upper housing 14 and lower housing 16 are in an assembled position. A securing member 46, such as a nut, is secured to an interior surface 48 of the side wall 30 of the lower housing 16, the securing member 46 being aligned with the aperture 42 of the lower housing 16 and adapted to receive the bolt 44 for securing the upper housing 14 to the lower housing 16 when the housings are in the assembled position. The securing member 46 can be affixed to the interior surface 48 of the side wall 30 of the lower housing 16 by any suitable means, such as by welding.

The bolt 44 is provided with a bolthead 50 and an operating shaft 52, the operating shaft 52 threadably engaging the securing member 46 for securing the upper housing 14 to the lower housing 16. When employing the security locking assembly 10 of the present invention, the dimensions of the bolt 44 are not critical. However, the security locking assembly 10 of the invention can readily be employed in combination with a penta-head bolt as required by Specification U-5 for Pad-Mounted Transformers, issued January, 1977, by the Rural Electrification Administration of the U.S. Department of Agriculture.

The security locking assembly 10 of the present invention, as depicted in the sectional view of FIG. 3, substantially prevents unauthorized removal of the bolt 44 from the housing assembly 12, and comprises a locking assembly housing 54, a pin 56, and a locking device 58 for securing the pin 56 to the locking assembly housing 54 so as to substantially prevent access to the bolthead 50 in a manner described hereinafter.

The locking assembly housing 54 comprises a base plate 60 having an aperture 62 therethrough, a cylindrical side wall 64 having an aperture 66 therethrough, and an orientation member 68. The aperture 62 of the base plate 60 is alignable with the apertures 40 and 42 of the upper housing 14 and lower housing 16, respectively, for receiving the bolt 44 when the upper housing 14 and the lower housing 16 are to be assembled and secured via the locking assembly 10.

The base plate 60, depicted as being of substantially circular configuration, is provided with a first side 70 and an opposed second side 72. The second side 72 of the base plate 60 abuts the sidewall 18 of the upper housing 14 at its lower end portion 26, substantially as shown in FIGS. 2 and 3. The first side 70 of the base plate 60 is adjacent the bolthead 50 of the bolt 44 when the locking assembly housing 54 of the security locking assembly 10, the upper housing 14 and the lower housing 16 are in an assembled position. The cylindrical side wall 64 extends outwardly from the first side 70 of the base plate 60 of the locking assembly housing 54 so that the base plate 60 and the cylindrical side wall 64 form a cup member. The aperture 66 is formed in an upper portion of the cylindrical side wall 64 of the locking assembly housing 54 substantially as shown in FIGS. 2 and 3.

The orientation member 68 of the locking assembly housing 54 extends outwardly from the second side 72 of the base plate 60. The orientation member 68 is positioned a distance from the aperture 62 of the base plate 60 and when the locking assembly housing 54 of the security locking assembly 10 is in a connected position (the aperture 62 of the base plate 60 aligned with the apertures 40 and 42 of the upper housing 14 and the lower housing 16, respectively, as hereinbefore described), the orientation member 68 will engage the ridge 38 formed between the lower end 28 of the upper housing 14 and the upper end portion 34 of the lower housing 16 and prevent rotation of the locking assembly housing 54.

Figure 4:
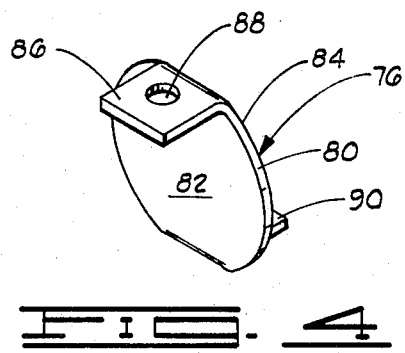
FIG. 4 is a perspective view of the cover assembly of FIG. 3.

Referring more specifically to FIGS. 3 and 4, the security locking assembly 10 further comprises a cover assembly 76. The cover assembly 76 is shaped such that it can be positioned within an interior portion 78 of the cup member formed by the base plate 60 and the cylindrical side wall 64, and maintained therein by the pin 56. Thus, the cover assembly 76, in combination with the locking assembly housing 54, substantially covers and encloses the head 50 of the bolt 44.

The cover assembly 76 includes a cover plate 80 having a first side 82 and an opposed second side 84 and a first tab member 86. The cover plate 80 is depicted as having a generally circular configuration and, as previously mentioned, is shaped so as to be positionable within the interior portion 78 of the locking assembly housing 54 of the security locking assembly 10 as defined by the cylindrical side wall 64 and the base plate 64. The first tab member 86 extends outwardly from one edge portion of the first side 82 of the cover plate 80 so as to be disposed near an interior portion 87 of the cylindrical side wall 64 of the locking assembly housing 54. The tab member 86 is provided with an aperture 88 therein, the aperture 88 of the tab member 86 being alignable with the aperture 66 in the cylindrical side wall 64 so that the pin 56 can be positioned therethrough to secure the cover assembly 76 within the locking assembly housing 54. A second tab member 90 extends outwardly from one edge portion of the opposed second side 84 of the cover plate 80, the second tab member 90 being positioned a distance removed from the first tab member 86 and opposite thereto substantially as shown in FIGS. 3 and 4. Further, the second tab member 90 is shaped such that the second tab member 90 is disposed near a second interior portion 91 of the cylindrical side wall 64 when the cover assembly 76 is placed in the locking assembly housing 54.

The pin 56 is shaped and constructed such that, when the pin 56 is positioned within the aperture 66 of the cylindrical side wall 64 of the locking assembly housing 54, a portion of the pin 56 will be disposed near a portion of the bolthead 50 of the bolt 44 to prevent access to the bolthead 50. Further, the pin 56 secures the cover assembly 76 within the interior portion 78 of the cylindrical side wall 64 of the locking assembly housing 54 as hereinbefore described.

The pin 56 is provided with a first end portion 92, a second end portion 94, a first medial portion 96 and a second medial portion 98. The pin 56 is shaped such that the first end portion 92 is disposed near the second end portion 94 when the pin is in a connected position. As shown in FIG. 3, the first medial portion 96 of the pin 56 extends through the aligned apertures 66 and 88 of the cylindrical side wall 64 and the first tab member 86, respectively; the second medial portion 98 of the pin 56 loops around the outside end of the locking assembly 54; and the first and second end portions 92 and 94 of the pin 56 are adjacent one another in a substantially parallel relationship.

The pin 56 is secured to the locking assembly housing 54 by the locking device 58, which is preferably any suitable device which substantially prevents the removal of the pin 56 from the locking assembly housing 54 without destruction of either the pin 56 or the locking assembly housing 54. This enables a repairman to readily detect if an unauthorized entry or attempted entry into the housing assembly 12 has been made or attempted. As shown in FIG. 3, the pin 56 can readily be secured in the locking assembly housing 54 by a hollow collar member 100 which is slidably positioned upon the first end portion 92 and the second end portion 94 of the pin 56. The collar member 100 can be secured to the first and second end portions 92 and 94 of the pin 56 by any suitable means. One effective method for securing the collar member 100 upon the first and second end portions 92 and 94 of the pin 56 is to provide a threaded aperture within a side portion 102 of the collar member 100. The threaded aperture is adapted to receive a threaded bolt 104 (shown in phantom in FIG. 3) which is disposed to have a portion extend between the first and second end portions 92, 94 of the pin 56, the bolt 104 thereby serving to forcibly press the first and second end portions 92, 94 against the interior surfaces of the collar member 100. As the bolt 104 is driven into the threaded aperture, the collar member 100 is caused to be securely attached to the first and second end portions 92, 94 of the pin 56.

In order to prevent unauthorized removal of the collar member 100 from the pin 56, it is desirable that the bolt 104 be fabricated of a material such as aluminum so that upon driving the bolt 104, into firm engagement with the threaded aperture of the collar member 100, such that the collar member 100 is securely attached to the first and second end portions 92, 94 of the pin 56, a minor amount of additional torque applied to the bolt 104 will sever the portion of the threaded bolt 104 extending outwardly from the collar member 100.

Figure 5:
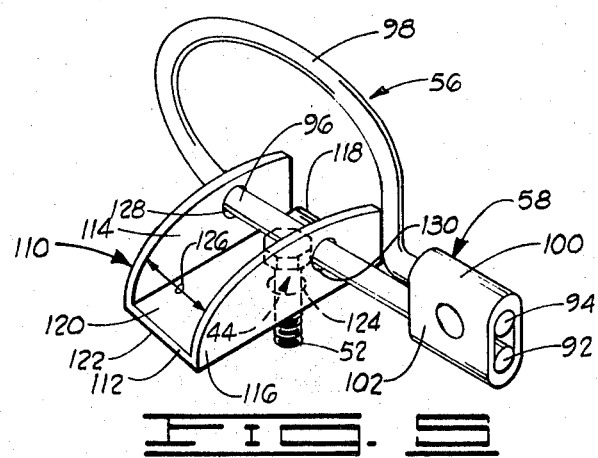
FIG. 5 is a perspective view of a second embodiment of the security locking assembly of the present invention having the pin operably connected to a second locking assembly housing so as to prevent access to the bolthead, the bolthead being shown in phantom.
Figure 6:
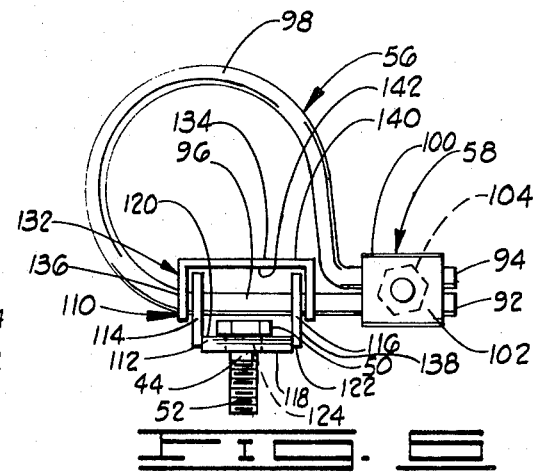
FIG. 6 is an end plan view of the security locking assembly of FIG. 5 having a cover assembly and the pin operably connected to the locking assembly housing and showing, in phantom, the bolthead employed to secure the collar member to the pin member.

Referring now to FIGS. 5 and 6, a modified locking assembly housing 110, constructed in accordance with the present invention is set forth. The locking assembly housing 110, usable in lieu of the locking assembly 54 in the security locking assembly 10, comprises a base plate 112, a first side wall 114, a second opposed side wall 116, and an orientation member 118. The base plate 112 is provided with a first side 120, an opposed second side 122, and an aperture 124. The opposed second side 122 of the base plate 112 abuts the lower end portion 26 of the side wall 18 of the upper housing 14 of the housing 12 of FIG. 1, and the first side 120 of the base plate 112 is adjacent the bolthead 50 of the bolt 44 when the locking assembly housing 110, the upper housing 14 and the lower housing 16 are in an assembled position.

The first side wall 114 extends outwardly from one edge portion of the first side 120 of the base plate 112; and the second side wall 116 extends outwardly from a second opposed edge portion of the first side 120 of the base plate 112. Thus, the second side wall 116 is spaced a distance 126 from the first side wall 114. The aperture 124 in the base plate 112 is disposed therein so as to be between the first side wall 114 and the second side wall 116, substantially as shown in FIGS. 5 and 6. The first side wall 114 and the second side wall 116 are each provided with the apertures 128 and 130, respectively, the apertures being aligned so that a common horizontal axis (not shown) extending through the apertures 124 and 126 of the first and second side walls 114 and 116 substantially intersects a vertically disposed central axis (also not shown) of the aperture 124 of the base plate 112. The aligned apertures 128 and 130 of the first and second side walls 114 and 116 are adapted to receive the pin member 56 for limiting access to the bolthead 50 of the bolt 44.

The orientation member 118 extends outwardly from the opposed second side 122 of the base plate 112. The orientation member 118 is positioned a distance from the aperture 124 of the base plate 112 so that when the locking assembly housing 110 is in a connected position, the aperture 124 of the base plate 112 is aligned with the apertures 40 and 42 of the upper housing 14 and the lower housing 16, respectively for receiving the bolt 44, as hereinbefore described with reference to FIGS. 1–4; and, the orientation member 118 engages the ridge 38 formed between the lower end 28 of the upper housing 14 and the upper end portion 34 of the lower housing 16 and prevents rotation of the locking assembly housing 110.

Referring to FIG. 6, the security locking assembly 10 further comprises a cover assembly 132. The cover assembly 132 is shaped such that it can be positioned for engagement with the first and second sidewalls 114 and 116 of the locking assembly housing 110 and secured thereto by the pin 56. Thus, the cover assembly 132, in combination with the locking assembly housing 110, substantially covers the bolthead 50 of the bolt 44.

The cover assembly 132 comprises a cover plate 134, a first leg member 136 and a second opposed leg member 138. The cover plate 134 is provided with a first side 140 and an opposed second side 142. The first leg member 136 extends outward from one edge portion of the second side 142 of the cover plate 134; and the second leg member 138 extends outwardly from an opposed edge portion of the second side 142 of the cover plate 134 so that the first and second leg members 136 and 138 are positioned in a spatial relationship to the other. The first and second leg members 136 and 138 of the cover assembly 132 are each provided with an aperture (not shown) such that when the first leg member 136 is aligned with one of the side walls of the locking assembly housing 110, such as the first side wall 114, and the second opposed leg member 138 of the cover assembly 132 is aligned with the other of the side walls of the locking assembly housing 110, such as the second side wall 116, the apertures of the first and second leg members 136 and 138 are aligned with the apertures 128 and 130 of the first and second side walls 114 and 116 so that the pin 54 can be positioned through the aligned apertures to secure the cover assembly 132 to the locking assembly housing 110.

The pin 56, is shaped and constructed such that when the pin 56 is extended through the apertures 128 and 130 of the side walls 114 and 116, respectively, of the locking assembly housing 110, a portion of the pin 56 will be disposed near and above at least a portion of the bolthead 50 of the bolt 44 and prevents access to the bolthead 50. Further, the shape and construction of the pin 56 enables one to secure the cover assembly 132 to the first and second side walls 114 and 116 of the locking assembly housing 110 as hereinbefore described.

As shown in FIGS. 5 and 6, the first medial portion 96 of the pin 56 is positioned within the aligned apertures 128 and 130 of the side walls 114 and 116, respectively; the second medial portion 98 of the pin 56 is disposed above the cover plate 134; and, the first and second end portions, 92 and 94, of the pin 56 are adjacent one another in a substantially parallel relationship.

The pin 56 is secured to the locking assembly housing 110 by the locking device 58, which is preferably any suitable device which substantially prevents the removal of the pin 56 from the locking assembly housing 110 without destruction of either the pin 56 or the locking assembly housing 110. This enables a repairman to readily detect if an unauthorized entry or attempted entry into the housing assembly 12 has been made or attempted. As shown in FIGS. 5 and 6, the pin 56 can readily be secured in the locking assembly housing 110 by a hollow collar member 100 which is slidably positioned upon the first end portion 92 and the second end portion 94 of the pin 56. The collar member 100 can be secured to the first and second end portions 92 and 94 of the pin 56 by any suitable means. One effective method for securing the collar member 100 upon the first and second end portions 92 and 94 of the pin 56 is to provide a threaded aperture within a side portion 102 of the collar member 100. The threaded aperture is adapted to receive a threaded bolt 104 (shown in phantom in FIG. 6) which is disposed to have a portion extend between the first and second end portions 92, 94 of the pin 56, the bolt 104 thereby serving to forcibly press the first and second end portions 92, 94 against the interior surfaces of the collar member 100. As the bolt 104 is driven into the threaded aperture, the collar member 100 is caused to be securely attached to the first and second end portions 92, 94 of the pin 56.

In order to prevent unauthorized removal of the collar member 100 from the pin 56, it is desirable that the bolt 104 be fabricated of a material such as aluminum so that upon driving the bolt 104 into firm engagement with the threaded aperture of the collar member 100, a minor amount of additional torque applied to the bolt 104 will sever the portion of the threaded bolt 104 extending outwardly from the collar member 100.

Operation

To further facilitate in the understanding of the present invention, the operation of the security locking assembly 10 will now be discussed. Because the security locking system 10 depicted in FIGS. 1 through 4 operates in substantially the same manner as the security locking assembly depicted in FIGS. 5 and 6, and for the sake of simplicity, only the operation of the security locking assembly 10 depicted in FIGS. 1 through 4 will be described. The lower end portion 26 of the upper housing 14 of the housing assembly 12 is positioned upon the upper end portion 34 of the lower housing 16 of the housing assembly 12 so that the apertures 40 and 42 in the upper housing 14 and lower housing 16, respectively, are aligned. The bolt 44 is positioned to extend through the aperture 72 of the locking assembly housing 54 and is threadably engaged with the securing nut member 46, and the orientation member 74 of the locking assembly housing 54 is positioned to engage the ridge 38 formed between the lower end 28 of the upper housing 14 and the upper portion 34 of the side wall 30 of the lower housing 16. The bolt 44 is driven into the securing nut member 46 by applying torque to the bolthead 50 of the bolt 44 until the locking assembly housing 54, the upper housing 14 and the lower housing 16 of the housing assembly 12 are secured in a fixed position.

Once the locking assembly housing 54 has been secured to the upper housing 14 and the lower housing 16 of the housing assembly 12 by the bolt 44, the cover assembly 76 is positioned within the interior portion 78 of the locking assembly housing 54 defined by the base plate 60 and the cylindrical side wall 64 so that the aperture 88 of the first tab member 86 of the cover assembly 76 is aligned with the aperture 66 in the cylindrical side wall 64. When the cover assembly 76 is so positioned, the second tab member 90 depends in a direction towards the interior portion 78 of the locking assembly housing 54. The pin 56 is then positioned within the aligned apertures 66 and 88 of the cylindrical side wall 64 and the first tab member 86, respectively, by inserting the first end portion 92 of the pin 56 through the aligned apertures until the first medial portion 96 of the pin 56 is extensive through the aligned apertures. Thereafter, the first and second end portions 92 and 94 of the pin 56, which are in a substantially parallel adjacent position, are secured by placing the collar member 100 thereupon.

The collar member 100 is secured to the first and second end portions 92, 94 of the pin 56 by applying torque to the bolt 104 to drive the bolt 104 into the threaded aperture of the collar member 100. After the collar member 100 has been firmly secured to the pin 56, additional torque is applied to the bolt 104 until the portion of the bolt 104 extending outwardly from the collar member 100 is severed.

By employing the unique combination of elements of the security locking assembly 10 of the present invention, it is readily apparent that the bolt 44, employed to join the upper housing 14 to the lower housing 16 of the housing assembly 12 is substantially protected from unauthorized removal. That is, unauthorized entry into the housing assembly 12 cannot be achieved without the removal of the pin 56 or damage to the locking assembly.

While the subject invention has been described in terms of certain preferred embodiments, and illustrated by certain drawings, such are intended for illustrative purposes only and alternative or equivalents may readily occur to those skilled in the art without departing from the spirit or scope from the invention as set forth in the appended claims.

What is claimed is:

1. An improved security locking assembly for substantially preventing unauthorized removal of a bolt having a bolthead, the bolt operably engaging a security member for joining two members together, the two members being characterized as a first and second housing wherein one of the housing telescopically receives a portion of the other housing such that one edge portion of the housing telescopically receiving the other housing forms a ridge, each of the first and second housing having an aperture therein such that in a connected position the apertures are aligned for receiving the bolt, the security locking assembly comprising:

a locking assembly housing secured to the first and second housing by the bolt and the securing member such that the bolthead is disposed substantially adjacent one surface of the locking assembly housing, the locking assembly housing comprising:
a base plate having a first side, and opposed second side, and an aperture;
wall means having at least one aperture therein, the wall means extending outwardly from the first side of the base plate;
an orientation member extending outwardly from the opposed second side of the base plate, the orientation member positioned a distance from the aperture of the base plate such that in the connected position the aperture of the base plate is aligned with the aperture of the first and second housing for receiving the bolt, the orientation member engaging the ridge formed by the edge portion of the housing telescopically receiving the portion of the other housing;

a pin having a first end portion and a second end portion, the pin extending through at least a portion of the locking assembly housing when the pin is in a connected position with the locking assembly housing, the pin being shaped such that in the connected position the first end portion of the pin is disposed near the second end portion of the pin, the pin and the locking assembly housing being shaped such that a portion of one of the locking assembly housing and the pin is disposed near and above at least a portion of the bolthead to substantially prevent access to the bolthead when the pin and the locking assembly housing are in the connected position; and means for securing the first end portion of the pin to the second end portion of the pin to substantially prevent removal of the pin from the locking assembly housing without destruction of a portion of one of the pin and the locking assembly housing.

2. The security locking assembly of claim 1 which further comprises a cover assembly, the cover assembly comprising:
a cover plate having a first side and an opposed second side, the cover plate being shaped such that the cover plate is positionable within an interior portion of the locking assembly housing defined by the wall means and the base plate such that the cover plate substantially covers the bolthead; and
a first tab member having an aperture therein, the first tab member extending from the first side of the cover plate and disposed near a first interior portion of the wall means of the locking assembly housing such that in a connected position the aperture of the first tab member is aligned with the aperture of the wall means and the pin is positioned therethrough to secure the cover assembly within the locking assembly housing.

3. The security locking assembly of claim 2 wherein the pin further includes a first medial portion and a second medial portion, the pin being shaped such that in the connected position the first medial portion extends through the aligned apertures of the first tab member of the cover assembly and the wall means of the locking assembly housing, the second medial portion is disposed above the first tab member of the cover assembly and the wall means of the locking assembly housing, and the first and second end portions of the pin are disposed substantially adjacent one another.

4. The security locking assembly of claim 3 wherein the means for securing the first end portion of the pin to the second end portion is a collar member.

5. The security locking assembly of claim 4 wherein the collar member is defined further as having a threaded aperture through one side portion, and wherein the security locking assembly further comprises a threaded bolt, the threaded bolt being shaped such that the threaded bolt is threadably engageable with the threaded aperture of the collar member for securely affixing the collar member to the first and second end portion of the pin, the threaded bolt further characterized as being fabricated of a material such that when the threaded bolt is driven into the threaded aperture of the collar member and engages one of the first and second end portions of the pin, a minor amount of additional torque applied to the threaded bolt will sever the portion of the bolt extending outwardly from the collar member.

6. The security locking assembly of claim 5 wherein the cover assembly further comprises a second tab member extending from the opposed second side of the cover plate, the second tab member being positioned a distance from the first tab member and shaped such that the second tab member is disposed near a second interior portion of the wall means of the locking assembly housing.

7. The security locking assembly of claim 6 wherein the wall means of the locking assembly housing is a cylindrical-shaped wall, the upper and lower housings form a power distribution equipment housing, and the securing member is affixed to an interior portion of the lower housing and aligned with the aperture therein, the upper housing and the lower housing being shaped such that in a connected position the lower end portion of the upper housing telescopingly receives the upper end portion of the lower housing, the apertures of the upper housing and the lower housings are aligned for receiving the bolt, the ridge is formed by the lower edge of the upper housing, and the securing member enables the bolt to join the upper housing and the lower housing.

8. The security locking assembly of claim 1 wherein the locking assembly housing comprises;

a base plate having an aperture therein, the base plate being further characterized as having a first side and an opposed second side;

at least two spaced-apart, opposed side walls extending outwardly from the first side of the base plate the aperture in the base plate being disposed between the opposite side walls of the locking assembly housing, each of the side walls having an aperture therein for receiving the pin; and the orientation member extending outwardly from the opposed second side of the base plate, the orientation member positioned a distance from the aperture of the base plate such that in the connected position the aperture of the base plate is aligned with the apertures of the first and second housing for receiving the bolt and the orientation member engages the ridge formed by the edge portion of the housing telescopingly receiving the other housing.

9. The security locking assembly of claim 8 wherein the apertures of the opposed side walls of the locking assembly housing are positioned such that a central horizontal axis of the aperture of the opposed side walls intersects a central vertical axis of the aperture of the base plate.

10. The security locking assembly of claim 9 which further comprising a cover assembly, the cover assembly comprising:

a cover plate having a first side and an opposed second side;

a first leg member having an aperture therein, the first leg member extending from the opposed second side of the cover plate; and a second leg member having an aperture therein, the second leg member extending from the opposed second side of the cover plate in a spatial relationship with the first leg member such that in a connected position the aperture of the first leg member is aligned with the aperture in one of the side walls of the locking assembly housing and the aperture of the second leg member is aligned with the aperture of the other of the side walls of the locking assembly housing and the pin is positioned through the aligned apertures to secure the cover assembly within the locking assembly housing and thus substantially cover the bolthead.

11. The security locking assembly of claim 10 wherein the means for securing the first end portion of the pin to the second end portion is a collar member.

12. The security locking assembly of claim 11 wherein the collar member is defined further as having a threaded aperture through one side portion, and wherein the security locking assembly further comprises a threaded bolt, the threaded bolt being shaped such that the threaded bolt is threadably engagable with the threaded aperture of the collar member for securely affixing the collar member to the first and second end portion of the pin, the threaded bolt further characterized as being fabricated of a material such that when the threaded bolt is driven into the threaded aperture of the collar member and engages one of the first and second end portions of the pin, a minor amount of additional torque applied to the threaded bolt will sever the portion of the bolt extending outwardly from the collar member.

13. The security locking assembly of claim 12 wherein the first and second housing are an upper and lower housing, the upper and lower housing form a power distribution equipment housing, the securing member is affixed to an interior portion of the lower housing and aligned with the aperture therein, the upper housing and lower housing being shaped such that in a connected position the lower end portion of the upper housing telescopingly receives the upper end portion of the lower housing, the apertures of the upper housing and the lower housing are aligned for receiving the bolt, the ridge is formed by the lower edge of the upper housing, and the securing member enables the bolt to join the upper housing and the lower housing.

* * * * *